INVENTORS
THEODORE H. SCHOEPF,
DAVID M. RITCHIE.
BY
ATTORNEYS

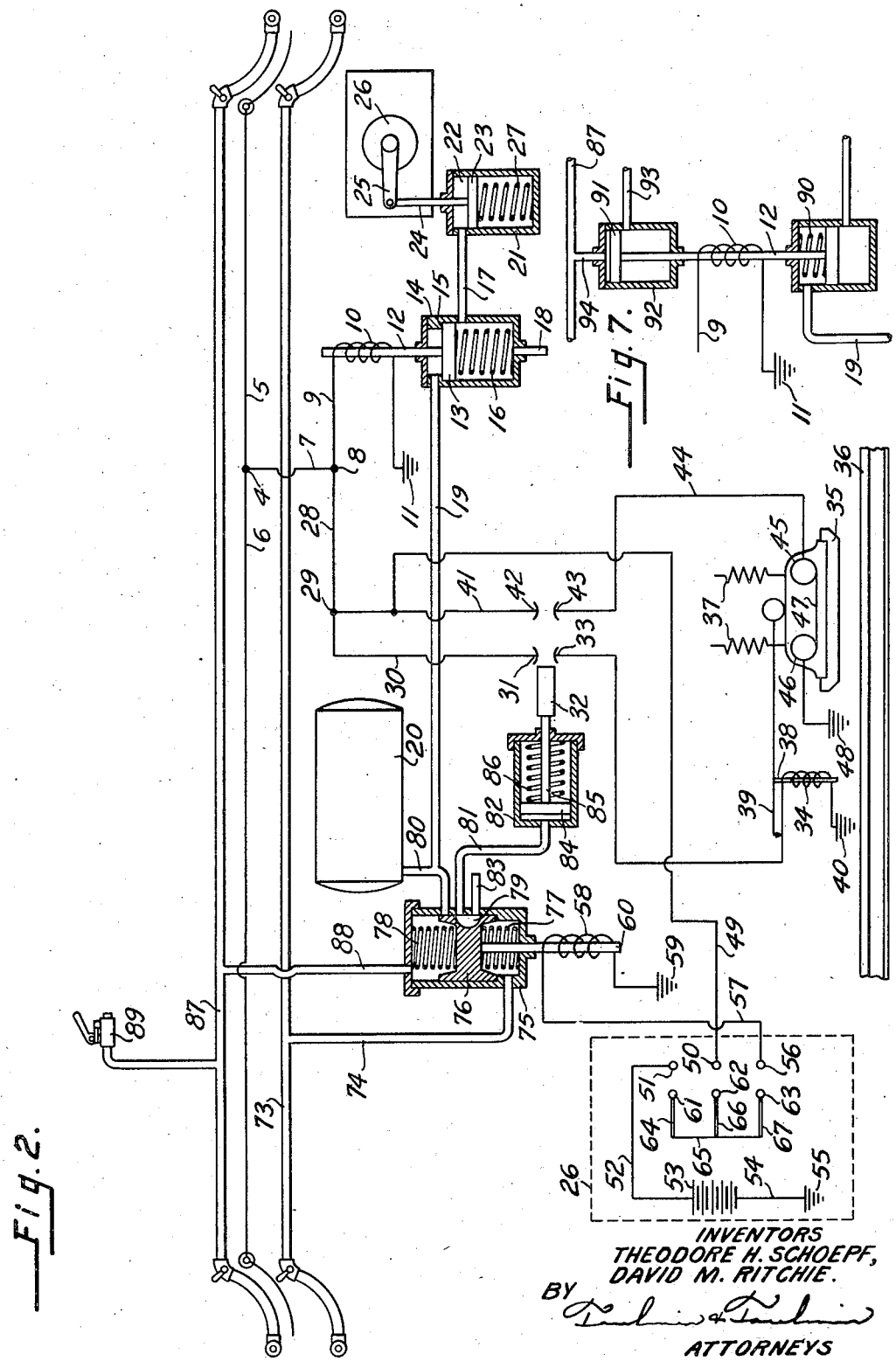

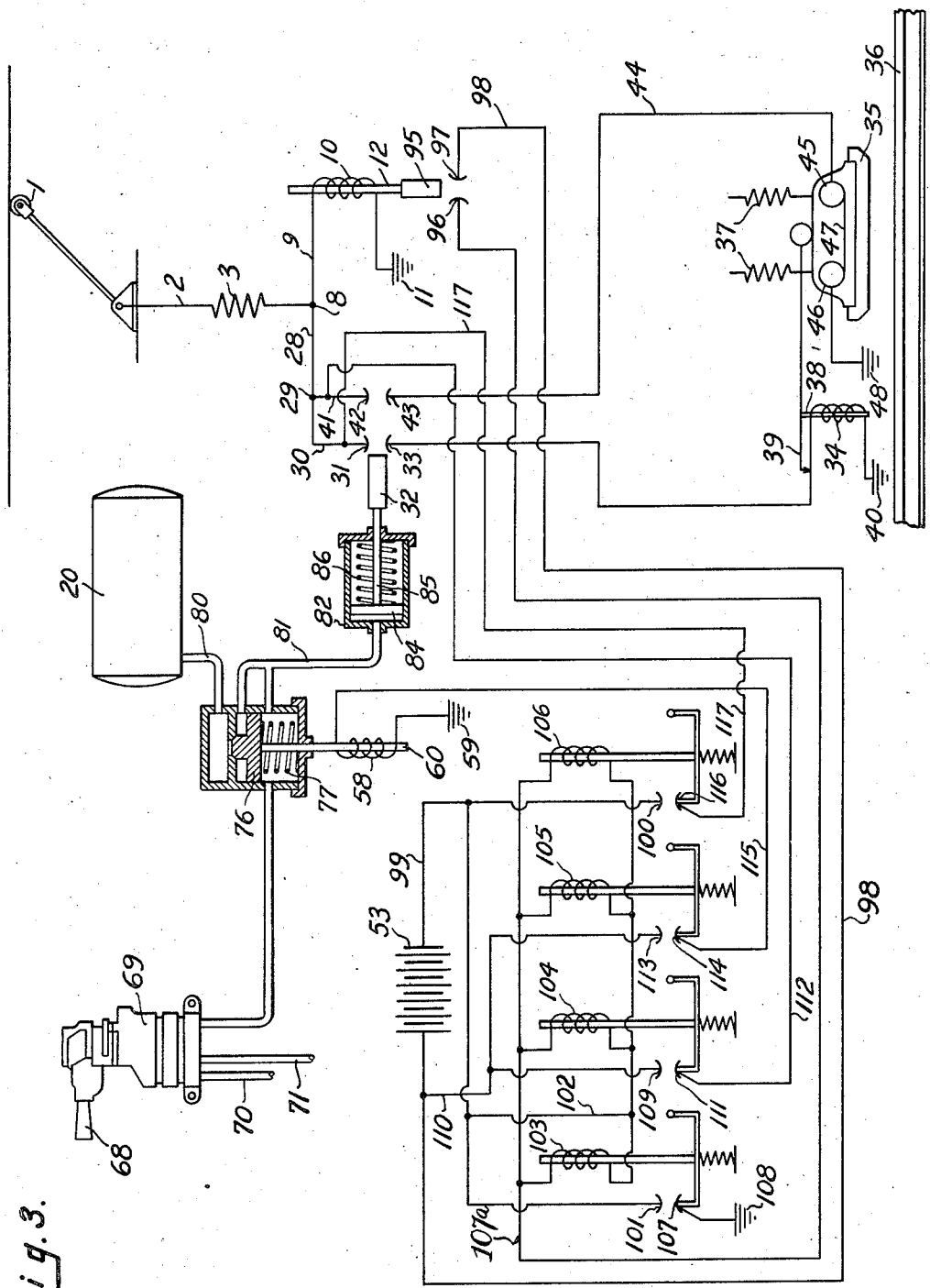

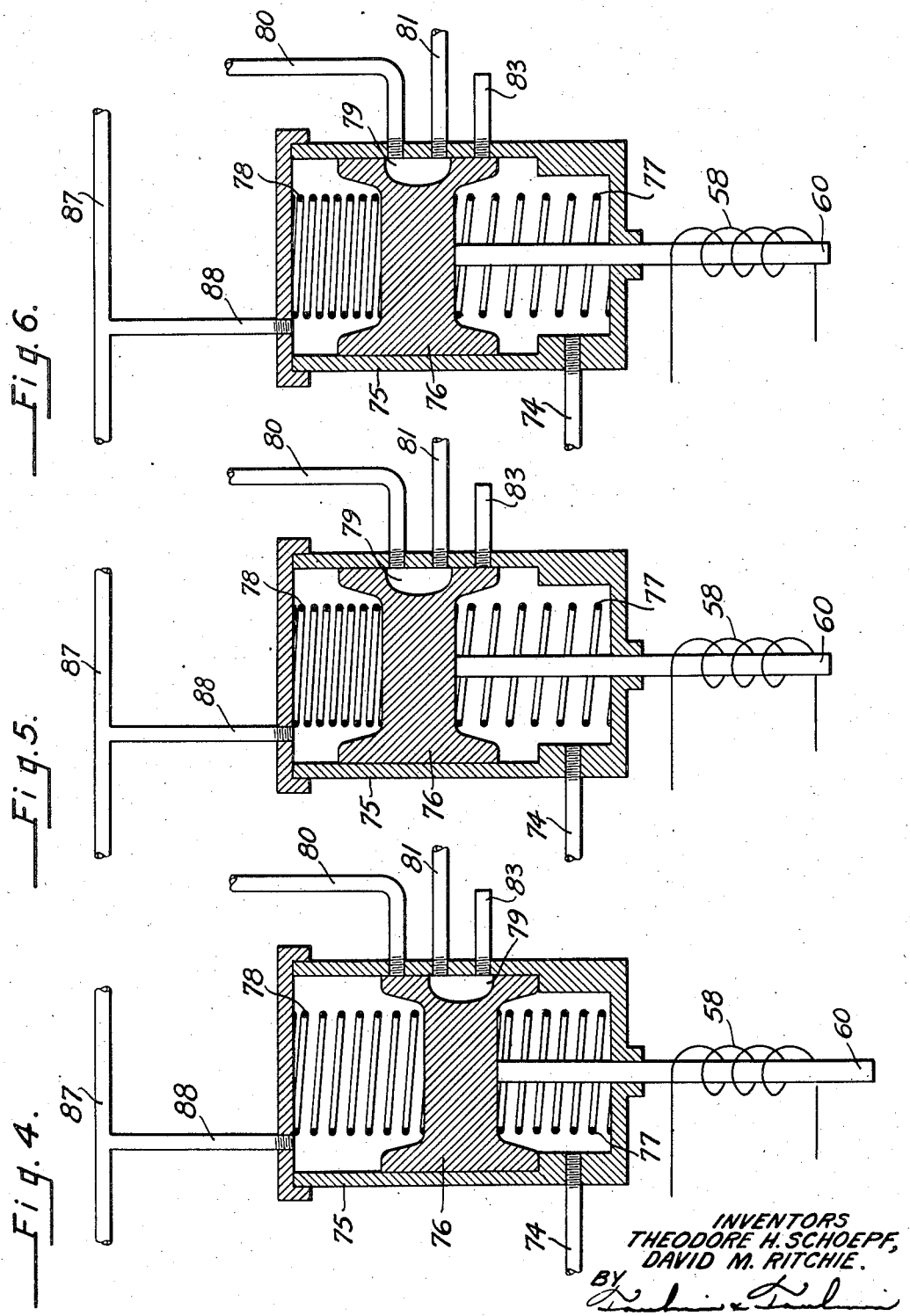

Patented May 12, 1936

2,040,814

UNITED STATES PATENT OFFICE 2,040,814

MAGNETIC TRACK BRAKE SYSTEM

Theodore H. Schoepf and David M. Ritchie, Cincinnati, Ohio, assignors to The Cincinnati Traction Bldg. Company, Cincinnati, Ohio, a corporation of Ohio Application December 22, 1934, Serial No. 758,787

13 Claims. (Cl. 303—3)

Our invention relates to magnetic track braking apparatus and methods of braking.

In particular it is our object to provide a magnetic brake system operable upon power failure, and associated with means to actuate the magnetic brake system when the independent air is applied, or automatically when some predetermined condition, such as an emergency arises.

It is the object of our invention to provide a magnetic brake system which is automatically applied and energized from an independent electrical source when the main power source, which normally energizes the magnetic brakes and which is also used as a source of motive power, fails. In such a condition it is our object to provide means of applying and energizing the brakes by the control of the air pressure operated by the operator, and utilizing the main power current for energization of the brakes; and also associate with the system so described an automatic air application of the magnetic track brakes, which serves to apply them and connect electrical means to energize them upon the decrease of pressure of the air, this last-mentioned method of applying the magnetic brakes and energizing them being dependent upon decrease of pressure being caused by some emergency or accomplished by the operator by reason of some emergency.

Referring to the drawings:

Figure 1 is a diagrammatic view showing the arrangement of the mechanism for applying and energizing the magnetic brake system upon the disruption of the main power source, which is ordinarily used also for driving the car on which the brakes are mounted; and this view also shows the associated mechanism for utilizing the main power source as a source of energization and the connecting of it to the brakes and the preliminary applying of the brakes to the rail, or bringing them within the magnetic zone by using independent or ordinary air, that is, by applying air pressure. There is also shown means by which a decrease of air in the automatic or emergency line will bring about the positioning or application and energization of the magnetic brakes.

Figure 2 is a similar view showing the brake arrangement in a trailer car.

Figure 3 is a similar view showing an alternative form of controller.

Figure 4 is a section through the air control valve, showing the parts in normal operating position.

Figure 5 is a similar view, showing them in the emergency application position.

Figure 6 is a similar view showing them in independent or ordinary or straight air application.

Figure 7 is a detail view of an alternative construction by which, when the power fails, the "no-voltage" solenoid will serve to exhaust the emergency or train line air pipe and at the same time provide for the application of air to move the controller and connect the emergency electrical source to the magnetic brake system.

Figure 1:
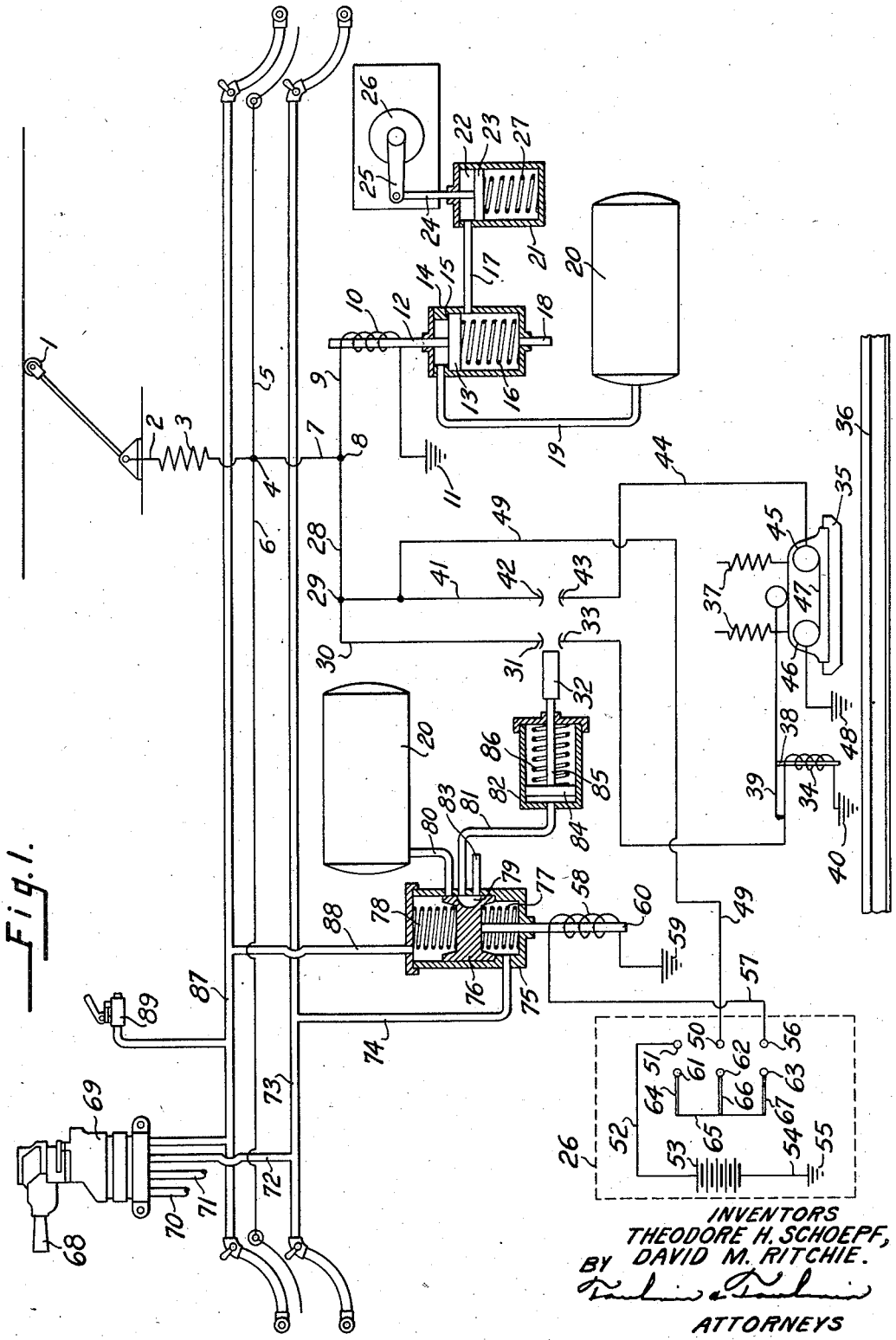

Referring to the drawings in detail, the following is the arrangement of the electrical and pneumatic circuits:

Electrical circuit

The trolley wheel harp and pole structure is designated by the numeral 1. Any other equivalent form of collecting power for the operation of the car and the supplying of current for brake magnetization purposes may be employed, such as a contact shoe on the third rail, and the like.

The line 2 having a resistance 3 therein is connected at junction 4 to the bus lines 5 and 6 for train line operation. The wire 7 is connected to the junction point 8. The junction point 8 is connected by a wire 9 on the righthand thereof to a solenoid coil 10, which is connected to ground at 11. The core 12 of this coil has a valve stem for the valve member 13, operating in the valve casing 14 and limited in its upward movement by a shoulder 15. Its downward movement is resisted by a helical spring 16.

The space beneath the valve member 13 in the position shown for the valve is connected to a pipe 17. There is also provided an exhaust 18. The space above the valve member 13 is connected by a pipe 19 to a source of air, designated 20. The air from this reservoir, when the valve member 13 is depressed, passes into the valve member 21 in the space 22 above the piston 23. This piston 23 is connected by a piston rod 24 to an arm 25 of a rotary drum controller 26. The piston 23 is yieldingly supported by the spring 27.

Returning to the junction point 8, the line 28 on the lefthand side thereof extends to the junction point 29 and thence by wire 30 to contact 31. This contact 31 is connected by the contact plunger 32 to the line 33, which passes to the solenoid 34 that draws the magnetic brake shoe 35 downwardly towards the rail 36, either against the rail or into the magnetic zone adjacent the rail. This brake shoe is normally maintained by the springs 37 from two to three inches above the rail in a safe position. The core 38 engaging the arm 39 when actuated by the solenoid 34, serves to press the brake shoe 35 into such magnetic zone or actually against the rail. The ground 40 is connected with the solenoid to complete that side of the circuit.

Returning to the junction point 29, it will be noted that the wire 41 is connected to a terminal 42, which in turn, is connected by the contact member 32 to the contact 43. This contact is connected to a wire 44 that is used to energize the magnet coils 45 and 46 in the magnetic brake shoe 35. These coils are connected together by the wire 47 and thence to the ground 48, completing the circuit.

In the event of failure to deliver power to the car then the line 49 will come into play, as hereinafter described. This line is connected into the drum controller 26 to the contact terminal 50. The terminal 51 of this controller is connected by the line 52 to the positive side of a battery 53. The negative side of this battery is connected by the line 54 to the ground 55. The terminal 56 is connected by the wire 57 to the solenoid coil 58, which is connected to the ground 59. The core of this coil, designated 60, constitutes a valve stem in the main air valve, which will be hereinafter described.

When the controller is rotated and brought into contact-making position, the contact terminal 61 engages 51. The terminal 62 engages 50, and the terminal 63 engages 56. These terminals 61, 62 and 63 are connected to one another by the wires 64, 65, 66 and 67.

Air piping arrangement

The numeral 68 designates a controller handle of the controller 69. This controller is supplied with air through the pipe 70. It is also provided with an exhaust pipe 71. The air thus supplied is delivered through the straight air line 72 into a line 73 that extends throughout the car and is connected by suitable hose connections, as illustrated, to similar sections of the line in other cars. A branch of this line 73, designated 74, is connected with the main air valve 75, normally beneath the valve member 76, which is connected to the valve stem 60. A spring 77 is located below this valve, and a spring 78 above it.

The valve member 76 has a cutaway portion 79 on one side thereof. The valve casing 75 has connected to it a pipe 80 from a source of supply, such as 20. This casing is also connected to the pipe 81, which is used for supplying air to the air switch closing valve 82. The pipe 83 is an exhaust pipe connected into this valve casing 75. The cutaway portion 79 is deep enough to permit of its spanning the open ends of two of the pipes just mentioned. For instance, it will span pipes 81 and 83 or pipes 80 and 81.

When the air is applied to the valve 82 the piston 84 and piston rod 85, carrying the contact switch member 32, are moved to the right hand against the spring 86.

Emergency application

The automatic or emergency line is designated 87 and communicates by a pipe 88 with the top of the valve casing 75, above the valve piston 76. Pressure is normally on this line. Upon a decrease in pressure in this line, either by the actuation of the controller 69 or by operation of the conductor's valve 89, or by any other means resulting in a decrease of pressure in the emergency line 87, then the valve member 76 will be moved in such a position as to permit of the application of air from some source, such as 20. This emergency line is connected by suitable hose connections to other cars in the train, when desired.

Referring to Figure 7, when the "no-voltage" solenoid is deenergized by a failure of the power supplied to the car, this solenoid 10 then permits its core and valve stem 12 to drop, and it is so moved downwardly with the spring 90 under the influence of the air from the air pipe 19. At the same time the valve stem 12 is connected to another valve member, constituting the piston 91 in the casing 92. This casing is provided with an exhaust 93 and is also connected by the pipe 94 to the emergency line 87. Upon deenergization of the "no-voltage" solenoid 10 the piston 91 drops down and permits the air in 87 to exhaust, thereby permitting the air from the source 20 to actuate the piston 84 to close the contacts 31, 33, 42 and 43.

Electrical actuation of the controller

In Figure 3 is shown an alternative means of utilizing an electric circuit for actuating the controller instead of the pneumatic circuit. When the power source is disrupted the "no-voltage" relay 10 drops its core 12, which carries on one end a contact member 95 which engages the contacts 96 and 97. The contact 97 is connected to the wire 98, which is connected to the positive side of the battery 53. The negative side of the battery is connected by the wire 99 to the contact 100, contact 101 and also by the wire 102 to the solenoid coils 103, 104, 105 and 106. The other sides of these coils are connected to the wire 107ª, which terminates in the terminal 96.

Upon the energization of these solenoids the contact 101 is connected to the contact 107 and thence to ground 108. The contact 109 is connected by the wire 110 to the line 98. It is connected to the contact 111 upon the closing of its solenoid switch. The contact 111 is connected by the wire 112 to the wire 41. The contact 113, which is also connected to the wire 110, now engages the contact 114, which is connected to the wire 115 that goes to the solenoid 58. The contact 100 is connected to the contact 116, which in turn, is connected by the wire 117 to the wire 30. The result is that the controller is closed and the emergency supply of electricity is provided for the magnetization of the brake and the operation of the air which closes the electrical circuits for moving the brake into either rail-engaging position or position to be drawn magnetically against the rail.

Method of operation

In the normal operation of the braking system the operator manipulates the handle 68 of the controller 69 in such a manner as to apply the straight air through the pipes 73 and 74, which leaves the valve member 76 so that the air supply 20 is brought into communication, through the pipe 81, with the switch closing valve 82, and the contacts 31, 33, 42 and 43 are closed. When this happens the brake shoe 35 is first moved downwardly into the magnetic zone adjacent the rails by the energization of the solenoid 34, and thereafter the brake is magnetized through the coils 45 and 46, due to the fact that the contacts 31 and 33 are made for moving the brake downwardly before the contacts 42 and 43 are made, which latter results in the energization of the brake. This final energization serves to draw the brake from its non-engaging position in the magnetic zone into its rail-engaging position and the braking is accomplished. There may be associated with this system the usual time limit disrupter, or disconnector in order to deenergize the brake to permit its removal from the rail after a predetermined period of time.

In the event that for emergency reasons it is desired to apply the emergency method of actuating this system, the air pressure in the line 87 is decreased either by the position of the controller or the conductor's valve, or otherwise. This will result in the spring 77 and such air pressure as may be associated therewith, one or both, in moving the valve member 76 to the position shown in Figure 5, whereupon the operation will be as heretofore indicated.

In the third condition, which is one of primary interest, when the source of power is disrupted for any reason the solenoid 10 becomes deenergized. This permits the air in the line 19 pressing the valve 13 down so that air can be delivered to the line 17, into the space 22 to depress the piston 23 and rotate the controller 26. This results in closing the contacts 61, 62 and 63, with the contacts 51, 50 and 55 as heretofore explained. When this is done the solenoid 58 is energized and the valve 76 is pulled up so as to admit air from the source 20 into the switch closing valve 82 to move the contact 32, first, to bridge the gap between 31 and 33 to energize the solenoid 34 to bring the brake 35 into the braking zone, and thereafter to close the contacts 42 and 43 to energize the magnetic coils of the brake, and effect the braking operation. The source of energy for these several operations is the electrical source, such as a battery 53.

The alternative arrangement shown in Figure 7 has already been described.

It will be understood that we desire to comprehend within our invention such modifications as come within the scope of our claims and our invention.

Having thus fully described our invention, what we claim as new and desire to secure by Letters Patent, is:

1. In a magnetic brake system, a straight air system, an emergency air system, a main electric power source, a supplementary electric power source, a magnetic brake, means of moving the brake into braking position, means of energizing the brake, said last-mentioned means being operable either from the main electric power source or supplementary power source, and means of connecting either of said power sources to the means for bringing the brake into braking position and for energizing it adapted to be operable from the straight air means or the emergency air means.

2. In a magnetic brake system, a magnetic track brake, electric means for moving said brake into braking position, electric means for energizing said brake, a main electric power source therefor, a supplementary electric power source therefor, means upon the failure of the main electric power source for connecting the supplementary electric power source in position to be put in circuit with the brake actuating and energizing means; an air circuit for successively closing the brake actuating and energizing circuits, and an emergency air circuit for likewise successively closing said circuits.

3. In a magnetic brake system, a magnetic track brake, electric means for moving said brake into braking position, electric means for energizing said brake, a main electric power source therefor, a supplementary electric power source therefor, means upon the failure of the main electric power source for connecting the supplementary electric power source in position to be put in circuit with the brake actuating and energizing means; an air circuit for successively closing the brake actuating and energizing circuits, an emergency air circuit for likewise successively closing said circuits, and means for automatically connecting said electric circuits irrespective of the operation of the air circuits in the event of the disruption of the main electric power circuit.

4. In a magnetic brake system, a magnetic track brake, electric means for moving the brake into braking position, electric means for magnetizing the brake, electric circuits for said means normally open, a main electric power circuit normally connected to a pair of said circuits, a supplementary electric source of power normally disconnected from said circuits, means to connect the supplementary electric power means when the main electric power means fails, electrically operated means for controlling the application of air to close said circuits after the emergency electric power means has been connected, means of supplying air therefor; and supplementary straight air means and emergency air means for controlling the application of said air so long as the main electric power circuit is operative.

5. In a magnetic brake system, a magnetic track brake, electric means for moving the brake into braking position, electric means for magnetizing the brake, electric circuits for said means normally open, a main electric power circuit normally connected to a pair of said circuits, a supplementary electric source of power normally disconnected from said circuits, means to connect the supplementary electric power means when the main electric power means fails, electrically operated means for controlling the application of air to close said circuits after the emergency electric power means has been connected, means of supplying air therefor; and supplementary straight air means and emergency air means for controlling the application of said air so long as the main electric power circuit is operative, said means connecting the supplementary electric power to said circuits comprising air-operated means operable by the disruption of the main electric power circuit.

6. In a magnetic brake system, a magnetic track brake, electric means for moving the brake into braking position, electric means for magnetizing the brake, electric circuits for said means normally open, a main electric power circuit normally connected to a pair of said circuits, a supplementary electric source of power normally disconnected from said circuits, means to connect the supplementary electric power means when the main electric power means fails, electrically operated means for controlling the application of air to close said circuits after the emergency electric power means has been connected, means of supplying air therefor; and supplementary straight air means and emergency air means for controlling the application of said air so long as the main electric power circuit is operative, said means for connecting the supplementary electric power to the circuits comprising electrically operated means operable by reason of the disruption of the main electric power supply means.

7. In a magnetic brake system, a magnetic track brake, electric means for moving the brake into braking position, electric means for magnetizing the brake, electric circuits for said means normally open, a main electric power circuit normally connected to a pair of said circuits, a supplementary electric source of power normally disconnected from said circuits, means to connect the supplementary electric power means when the main electric power means fails, electrically operated means for controlling the application of air to close said circuits after the emergency electric power means has been connected, means of supplying air therefor; and supplementary straight air means and emergency air means for controlling the application of said air so long as the main electric power circuit is operative, said means for connecting the supplementary electric power means in circuit comprising means operable upon the failure of the main electric power supply means and means operated thereby for opening the emergency air line means and connecting the means for connecting the supplementary electric power means in circuit.

8. In a magnetic brake system, a magnetic brake, means for applying the brake, means for energizing the brake, a main electric supply source, a supplementary electric supply source, a straight air line system, an emergency air line system, means of supplying air for applying and energizing said brake by connection to one of said electric power sources, said air means being adapted to be applied by the reduction of air in the emergency line system or the application of the pressure in the straight air line system; and means controlled by the disruption of the main electric power source for connecting in circuit the supplementary electric power source and of applying the air for closing the circuit to apply and energize the rail brake.

9. In a magnetic brake system, a magnetic brake, means for applying the brake, means for energizing the brake, a main electric supply source, a supplementary electric supply source, a straight air line system, an emergency air line system, means of supplying air for applying and energizing said brake by connection to one of said electric power sources, said air means being adapted to be applied by the reduction of air in the emergency line system or the application of the pressure in the straight air line system, and means controlled by the disruption of the main electric power source for connecting in circuit the supplementary electric power source and of applying the air for closing the circuit to apply and energize the rail brake, said means comprising means to relieve the air in the emergency air line system.

10. In a magnetic brake system, a magnetic brake, means for applying the brake, means for energizing the brake, a main electric supply source, a supplementary electric supply source, a straight air line system, an emergency air line system, means of supplying air for applying and energizing said brake by connection to one of said electric power sources, said air means being adapted to be applied by the reduction of air in the emergency line system or the application of the pressure in the straight air line system; means controlled by the disruption of the main electric power source for connecting in circuit the supplementary electric power source and of applying the air for closing the circuit to apply and energize the rail brake, and means for applying air to actuate connecting means to connect the supplementary electric power means in circuit.

11. In a magnetic brake system, a magnetic brake, electrical means for applying the brake, electrical means for energizing the brake, means for connecting said last-mentioned means to a source of electrical energy, a main electrical source, a supplementary electrical source, an emergency air means for connecting one of the electrical sources in circuit, a straight air means for alternatively connecting one of the electrical means in circuit, and means controlled by the operation of the main electrical power means for connecting the supplementary electrical power means for use in circuit when the main electrical power means fails.

12. In a magnetic brake system, a magnetic brake, electrical means for applying the brake, electrical means for energizing the brake, means for connecting said last-mentioned means to a source of electrical energy, a main electrical source, a supplementary electrical source, an emergency air means for connecting one of the electrical sources in circuit, a straight air means for alternatively connecting one of the electrical means in circuit, means controlled by the operation of the main electrical power means for connecting the supplementary electrical power means for use in circuit when the main electrical power means fails, and means rendering operative the emergency air line means for closing the circuits in such an event.

13. In a magnetic brake system, a magnetic brake, electrical means for applying the brake, electrical means for energizing the brake, means for connecting said last-mentioned means to a source of electrical energy, a main electrical source, a supplementary electrical source, an emergency air means for connecting one of the electrical sources in circuit, a straight air means for alternatively connecting one of the electrical means in circuit, means controlled by the operation of the main electrical power means for connecting the supplementary electrical power means for use in circuit when the main electrical power means fails, and electrically operated means for actuating the closing means for the circuits upon the failure of the main electrical power means irrespective of the operation of the emergency and straight air line systems.

THEODORE H. SCHOEPF.
DAVID M. RITCHIE.